No. 872,588. PATENTED DEC. 3, 1907.
J. C. STEAD.
APPARATUS FOR THE MANUFACTURE OF CARBON DIOXID.
APPLICATION FILED AUG. 23, 1905.
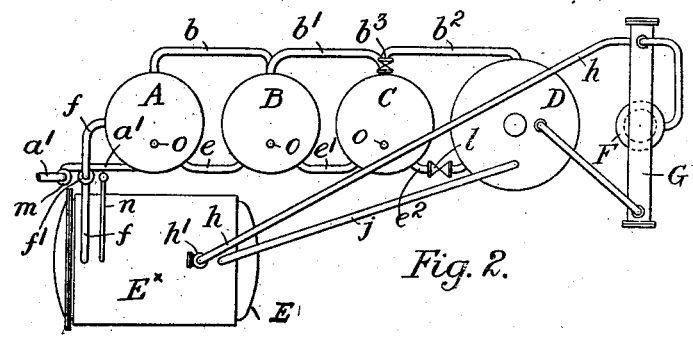
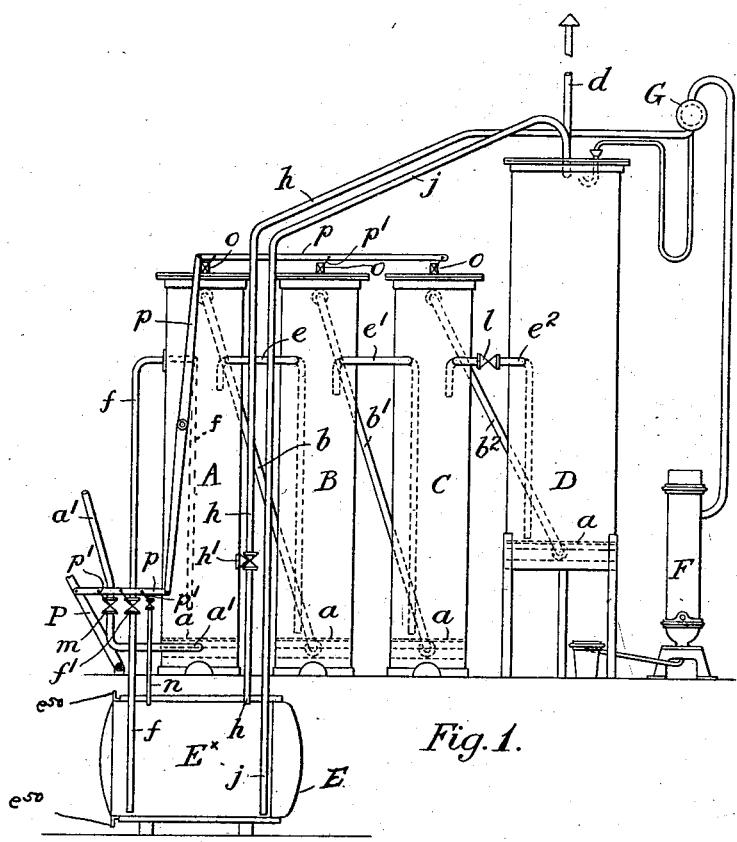

UNITED STATES PATENT OFFICE.

JOHN CHRISTOPHER STEAD, OF LONDON, ENGLAND.

APPARATUS FOR THE MANUFACTURE OF CARBON DIOXID.

No. 872,588.　　　　Specification of Letters Patent.　　　　Patented Dec. 3, 1907.

Application filed August 23, 1905. Serial No. 275,335.

*To all whom it may concern:*

Be it known that I, JOHN CHRISTOPHER STEAD, a subject of the King of Great Britain and Ireland, residing at 42 Grove Green road, Leytonstone, London, England, have invented new and useful Improvements in Apparatus for the Manufacture of Carbon Dioxid, of which the following is a specification.
This invention has reference to improvements in apparatus for the manufacture of carbon dioxid from furnace or other mixture of gases containing $CO_2$ by passing such gases through a suitable lye which absorbs the $CO_2$ leaving the other gases free to escape, the $CO_2$ being afterwards separated from the lye by heating the latter.

The objects of my invention are to cause the lye to travel intermittently in a direction opposite to the flow of the gases without employment of a pump; to enable a separate boiling-off vessel to be readily filled and emptied when required; and to so simplify the apparatus that the attention required in working it is reduced to a minimum.

In carrying my invention into practice, I employ a series of closed bicarbonating vessels the majority of which may for convenience be all at one level and which vessels are connected by pipes leading from the top of the first to the bottom of the second, from the top of the second to the bottom of the third and so on through the series, by which pipes the furnace or similar $CO_2$ containing mixture of the gases after being passed through the lye in the first bicarbonating vessel will be caused to circulate or pass through the whole series of bicarbonating vessels, the last of these vessels being provided with a pipe through which the gases, deprived by the lye of the bulk of their $CO_2$, may escape. I, further, employ a separate boiling-off vessel placed at a lower level than the bicarbonating vessels, with which boiling-off vessel the first bicarbonating vessel is connected by a pipe leading from below the level of the lye in the latter vessel to about the bottom of the former and through which pipe the lye when it has taken up or absorbed a sufficient quantity of $CO_2$ may be allowed to flow into the boiling-off vessel by the action of gravity. The bicarbonating vessels are also provided with inverted U-shaped pipes having branches or legs of unequal length, leading preferably from the lower part of the second into the upper part of the first, and similarly from the third to the second and so on through the whole series, whereby, when the boiling-off vessel is being filled, the lye in the bicarbonating vessels is automatically fed forwards, the last vessel also having a pipe leading from its upper part to about the bottom of the boiling-off vessel, the arrangement being such that when the boiling-off vessel is being charged with lye from the first bicarbonating vessel the quantity drawn off from the latter will be replaced—through the bent connecting pipe—by an equal quantity from the second, and so on through the series, the level of the lye in the last vessel before boiling-off vessel is charged being higher than that in the other vessels. After the boiling-off vessel has been charged, communication with the bicarbonating vessel from which it is charged is shut off and its contents heated to cause the $CO_2$ to be given off, this gas being conducted by a pipe to a condenser and from the latter to a suitable gas holder. When the bulk of the $CO_2$ has been evolved, the communication with the condenser is shut off, but the heating of the lye is continued until a sufficient pressure is created— due to a further evolution of $CO_2$ and also the formation of steam—to force the lye through the pipe leading into the last of the series of bicarbonating vessels, thereby again raising the level of the lye in the latter, which will materially assist the drawing off action from such bicarbonating vessel when the boiling-off vessel is next charged.

In the accompanying drawing, I have illustrated a form of my apparatus, Figure 1 being a side elevation and Fig. 2 a plan view thereof.

In the drawing, I show four bicarbonating vessels, A, B, C and D, but it will be understood that I do not confine myself to such a number, as that would depend upon the particular circumstances and conditions involved in each case. Each of these vessels is provided with a finely perforated false bottom $a$, below which the gas is introduced.

The vessels having been filled to within a short distance to the top with a suitable lye, the furnace or other suitable $CO_2$-containing mixture of gases is introduced through a pipe $a'$ by opening its valve $m$ to below the perforated bottom in the vessel A. These gases, previous to their introduction into the vessel A, are washed, purified and cooled in any usual or known manner. After their introduction they will pass up through the perforated false bottom (by which they are finely subdivided) and through the lye into the space above the latter, a portion of their $CO_2$ being absorbed by the lye during their passage therethrough. From the top of the vessel A the gases are conducted by a pipe $b$ to below the perforated false bottom in the vessel B, and after passing up through the lye and having had a further portion of their $CO_2$ absorbed they are conducted by a pipe $b'$ from the top of B to below the false bottom in C, and from this latter similarly to the vessel D by a pipe $b^2$. By the time the gases have passed through the lye in the last vessel D, the bulk of their $CO_2$ will have been absorbed, and the remaining and, for the purpose of my invention, useless gas or mixture of gases is allowed to escape by a pipe $d$, which is of sufficient length to cause any vapor carried off by the gas to be condensed and to run back into the vessel D, or said pipe may be provided with a condenser.

Communicating respectively with the vessels B—A, C—B, and D—C, are inverted U-shaped connecting pipes $e$, $e'$ and $e^2$ having legs or branches of unequal length and arranged as shown or in any other manner found most suitable, and the vessel A is in communication with a separate boiling-off vessel E (which is placed at a lower level) by a siphon pipe $f$ having a stop valve or cock $f'$, said pipe leading from below the level of the lye in the vessel A to about the bottom of the boiling-off vessel, the arrangement being such that when the valve $f'$ is opened lye from the vessel A will flow into the boiling-off vessel E and the quantity of lye thus drawn off from A will be replaced by an equal quantity flowing from B into A through the pipe $e$, and similarly lye will flow from the vessels C and D into B and C respectively through the pipes $e'$ and $e^2$, the level of the lye in the vessel D prior to the charging of the boiling-off vessel being of course sufficiently high to assist the flow.

As the furnace or other mixture of gases containing $CO_2$ are introduced at greater than atmospheric pressure into the vessel A, a pressure will exist in the vessels A, B, and C greater than in D which is open to the atmosphere—through the pipe $d$—and, to prevent the lye being forced from C into D, I provide the connecting pipe $e^2$ with a back pressure valve $l$ and I provide the pipe $b^2$ leading from the vessel C into the vessel D with a pressure reducing valve $b^3$ see Fig. 2 by which the pressure in the bicarbonators A, B and C can be regulated. Each of the vessels A, B and C is provided at its top with a snifting valve $o$ for the purpose hereinafter described, and if desired the connecting pipes $e$, $e'$ may have a back-pressure valve similar to the pipe $e^2$.

The boiling-off vessel is provided with a steam jacket or a steam coil or other means to enable its contents to be readily heated, and herein I have shown the boiling-off vessel as provided with a steam jacket as Ex, having connections $e^{50}$ to include the jacket in a steam supply system of any suitable character, not shown, as it forms no part of my invention, and from the top of said vessel a pipe or gas main $h$ having a three-way cock $h'$ enables said vessel to be put in communication with a condenser F and a gas-holder (not shown), and a pipe $j$ leading from the bottom of the boiling-off vessel to the top of the vessel D enables the lye in the former vessel to be transferred to the latter as will be hereinafter described.

My improved apparatus operates as follows:—The vessels A, B, C, D having been filled to the required extent with lye, the valve $m$ is opened and the furnace or other mixture of gases containing $CO_2$ is allowed to flow from one to the other through the whole series of bicarbonating vessels. When the lye in the vessel A has taken up a sufficient quantity of $CO_2$, the valve $m$ is shut and the valve $f'$ opened so that bicarbonated lye from the vessel A will flow into the boiling-off vessel E, the atmosphere within the boiling-off vessel being allowed to escape through a snift $n$, and when the vessel is sufficiently charged the valve $f'$ is again shut. When the furnace gases are shut off, the snifting valves $o$ are opened to bring the pressure within the vessels A, B and C down to atmospheric, that is to say, the same as that within the vessel D, the equalization of pressure in all the vessels permitting the U-shaped connections to act so that the vessels A, B and C are again filled to their normal level. The three-way cock $h'$ is next opened to the atmosphere and steam is admitted into the jacket or equivalent of the boiling-off vessel to heat the bicarbonated lye and cause it to give off its $CO_2$. When the temperature of the bicarbonated lye has risen sufficiently, the air contained within the boiling-off vessel escapes through the cock $h'$, said cock is next turned so that the $CO_2$ being given off will flow through the pipe $h$ to the condenser F, a suitable trap or catch-all G intercepting condensed vapors and returning these into the vessel D. From the condenser the $CO_2$ is conveyed to a gas holder, any remaining condensed vapor having been trapped off after leaving the condenser. When the bulk of the $CO_2$ has been given up by the lye in the boiling-off vessel, the cock $h'$ is shut and the heating of the lye is continued until a sufficient gaseous pressure is created within said vessel to drive the lye up the pipe $j$ and into the top of the vessel D. This lye just returned from the boiling-off vessel, being now decarbonated, is ready when sufficiently cool to again absorb $CO_2$, and the cooling may be effected in a separate vessel intermediate of the boiling-off vessel and the vessel D, or in the vessel D itself, the cooling being assisted by the lye in the latter case coming into contact and to a considerable extent intermingling with the cool lye already in said vessel, as well as by the passage therethrough of the cool $CO_2$-containing gases. Immediately after the boiling-off vessel has been charged and the cock $f'$ shut, the gas supply cock or valve $m$ is again opened to permit a further saturation of the lye with $CO_2$ in the vessels A, B, etc., so that, after the boiling-off vessel has been emptied as described, it is ready to be again charged, the cycle of operations described being repeated.

In order to facilitate the opening and shutting of the cocks $m$ and $f'$ and the snifting valves $n$ and $o$, I provide a lever P which, by suitable rods $p$ and links $p'$, shown diagrammatically in Fig. 1, is so connected to the cocks and valves that the mere pulling of the lever in one or other direction will operate all said cocks and valves.

The bicarbonating and boiling-off vessels are provided with gage glasses, man-holes and, if desired, also with pressure gages and safety valves; and herein the vessel D is shown in the drawing at a higher level than the vessels A, B, and C.

When the nearly decarbonated lye in the boiling-off vessel is being heated (after the $CO_2$ exit is closed) it may happen that the evolution of $CO_2$ is not sufficiently rapid to cause the lye to be forced into the vessel D in a reasonable period of time. In such event I may, for example, supplement the quantity of $CO_2$ evolved within said boiling-off vessel by furnace gases under pressure.

What I claim as my invention and desire to secure by Letters Patent is:—

1. Apparatus for the recovery of $CO_2$ from furnace or like gases by alternate bi-carbonation and decarbonation of a $CO_2$ absorbing lye through which said gases are passed, comprising a plurality of bi-carbonating vessels connected in series by bent pipes, and by separate gas-circulating pipes, and a separate decarbonating boiling-off vessel arranged on a lower level than said bi-carbonating vessels and connected with the first and the last of the series of bi-carbonating vessels, whereby the lye is returned to the last of the bi-carbonating vessels by fluid pressure generated in said boiling-off vessel.

2. Apparatus for the recovery of $CO_2$ from furnace or like gases by alternate bi-carbonation and decarbonation of a $CO_2$ absorbing lye through which said gases are passed, and in which the lye is circulated in one direction by the head of liquid and returned by fluid pressure, consisting in the combination of a plurality of bi-carbonating vessels connected in series by pipes through which the lye flows from vessel to vessel, separate gas-circulating pipes connecting the vessels and through which pipes the gas is made to pass from vessel to vessel in the reverse direction from that in which the lye flows, a boiling-off vessel placed below said bi-carbonating vessels, pipes $f$ and $j$ connecting the boiling-off vessel with the first and last of the series of bi-carbonating vessels, the pipe $f$ extending to near the bottom of the boiling-off vessel and the pipe $j$ leading to the last bi-carbonating vessel extending to near the bottom of said boiling-off vessel, cocks on said pipes, means for snifting said boiling-off vessel, and means for rapidly heating the contents of the boiling-off vessel to first drive off the $CO_2$ from said vessel and thereafter to return the lye through pipe $j$ to the connected bi-carbonating vessel, such return of the lye to the connected bi-carbonating vessel being effected by the fluid pressure generated in the boiling off vessel.

3. In apparatus for recovery of $CO_2$ from furnace or like gases by alternate bicarbonation and decarbonation of a $CO_2$ absorbing lye, through which said gases are passed, the combination of a plurality of bicarbonating vessels connected in series by gas-circulating pipes leading from the upper end of one vessel to the lower end of the next one, separate inverted U-shaped lye-conducting pipes leading from near the lower end of one vessel to near the upper end of the next, a boiling-off vessel at a lower level than said bi-carbonating vessels, a siphon connection between the first one of the latter and the boiling-off vessel, to charge the latter, a separate connection between the boiling-off vessel and the last one of the bicarbonating vessels, whereby the decarbonated charge of lye is returned thereto by pressure generated in the boiling-off vessel, and a separate outlet for the $CO_2$ driven off from the charge in the boiling-off vessel.

4. In apparatus for the recovery of $CO_2$ from furnace or like gases by alternate bicarbonation and decarbonation of a $CO_2$ absorbing lye through which said gases are passed, a plurality of bicarbonating vessels connected in series by separate lye-conducting and gas-circulating pipes, the head of liquid in the last vessel being greater than in the others, a decarbonating boiling-off vessel below the level of the bicarbonating vessels, a siphon connection between the first one of the last vessels and the boiling-off vessel to introduce a charge of bicarbonated lye thereto, and means to discharge the decarbonated lye from the boiling-off vessel to the last one of the bicarbonating vessels by fluid pressure in the boiling-off vessel generated by heat.

In testimony whereof I have signed my name to this specification in the presence of two subscribing witnesses.

JOHN CHRISTOPHER STEAD.

Witnesses:
 HENRY IMRIE,
 H. D. JAMESON.